US008396487B2

(12) United States Patent
Kojo et al.

(10) Patent No.: US 8,396,487 B2
(45) Date of Patent: Mar. 12, 2013

(54) LOCATION ACQUIRING SYSTEM AND LOCATION INFORMATION ACQUIRING METHOD

(75) Inventors: Yu Kojo, Setagaya-ku (JP); Michiko Wakui, Yokosuka (JP); Yasuyuki Honda, Yokohama (JP); Eisuke Endoh, Yokohama (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 18 days.

(21) Appl. No.: 13/141,295

(22) PCT Filed: Dec. 22, 2009

(86) PCT No.: PCT/JP2009/007122
§ 371 (c)(1),
(2), (4) Date: Jun. 21, 2011

(87) PCT Pub. No.: WO2010/073621
PCT Pub. Date: Jul. 1, 2010

(65) Prior Publication Data
US 2011/0256885 A1 Oct. 20, 2011

(30) Foreign Application Priority Data
Dec. 22, 2008 (JP) ................................. 2008-325420

(51) Int. Cl.
*H04W 24/00* (2009.01)
(52) U.S. Cl. .................................. 455/456.1; 455/456.2
(58) Field of Classification Search ................ 455/456.1, 455/456.2
See application file for complete search history.

(56) References Cited

U.S. PATENT DOCUMENTS

| 7,248,884 B2 * | 7/2007 | Miyamoto | 455/456.2 |
| 7,392,132 B2 | 6/2008 | Matsuo | |
| 8,046,004 B2 * | 10/2011 | Tsuchiya | 455/456.4 |
| 2004/0171391 A1 | 9/2004 | Muramatsu | |
| 2004/0266455 A1 * | 12/2004 | Lee et al. | 455/456.1 |

(Continued)

FOREIGN PATENT DOCUMENTS

| EP | 1 298 621 A2 | 4/2003 |
| EP | 1 447 647 A2 | 8/2004 |

(Continued)

OTHER PUBLICATIONS

PCT/JP2009/007122 PCT/IB/338.

(Continued)

*Primary Examiner* — Kent Chang
*Assistant Examiner* — Ngan Pham Lu
(74) *Attorney, Agent, or Firm* — Crowell & Moring LLP

(57) ABSTRACT

There are provided a location acquiring system that allows acquiring of location information that keeps track of the movement of a mobile communication terminal to be searched for, with the transmission and reception of signals for acquiring the location information being suppressed, and a location information acquiring method. A session establishment unit 124 of an application unit 12 in a management server 10 establishes a session between a location acquiring request terminal 20 and a to-be-searched terminal 30 for continuously transmitting the location information of the to-be-searched terminal 30 to the location acquiring request terminal 20, when an information transmission and reception unit 11 receives location information acquiring request information for making a request of acquiring location information of the to-be-searched terminal 30 from the location acquiring request terminal 20.

10 Claims, 7 Drawing Sheets

U.S. PATENT DOCUMENTS

2007/0213089 A1   9/2007   Ito
2007/0244638 A1   10/2007  Lee
2010/0240391 A1*  9/2010   Povey .................. 455/456.1

FOREIGN PATENT DOCUMENTS

| EP | 2 051 491 A2 | | 4/2009 |
| JP | 11-086195 A | | 3/1999 |
| JP | 2000-009486 A | | 1/2000 |
| JP | 2000-298033 A | | 10/2000 |
| JP | 2001-268620 A | | 9/2001 |
| JP | 2004-328309 A | | 11/2004 |
| JP | 2006-060277 A | | 3/2006 |
| JP | 2006-105731 A | * | 4/2006 |
| JP | 2007-243713 A | | 9/2007 |
| WO | WO 03/107303 A1 | | 12/2003 |
| WO | WO 2004/060003 A1 | | 7/2004 |

OTHER PUBLICATIONS

PCT/JP2009/007122 PCT/IB/373.
PCT/JP2009/007122 PCT/ISA/237 (Translation).
PCT/JP2009/007122 PCT/ISA/210.
Japanese Office Action w/Translation, dated Apr. 24, 2012, 6 pages total.
European Search Report, dated Apr. 16, 2012, 7 pages total.

* cited by examiner

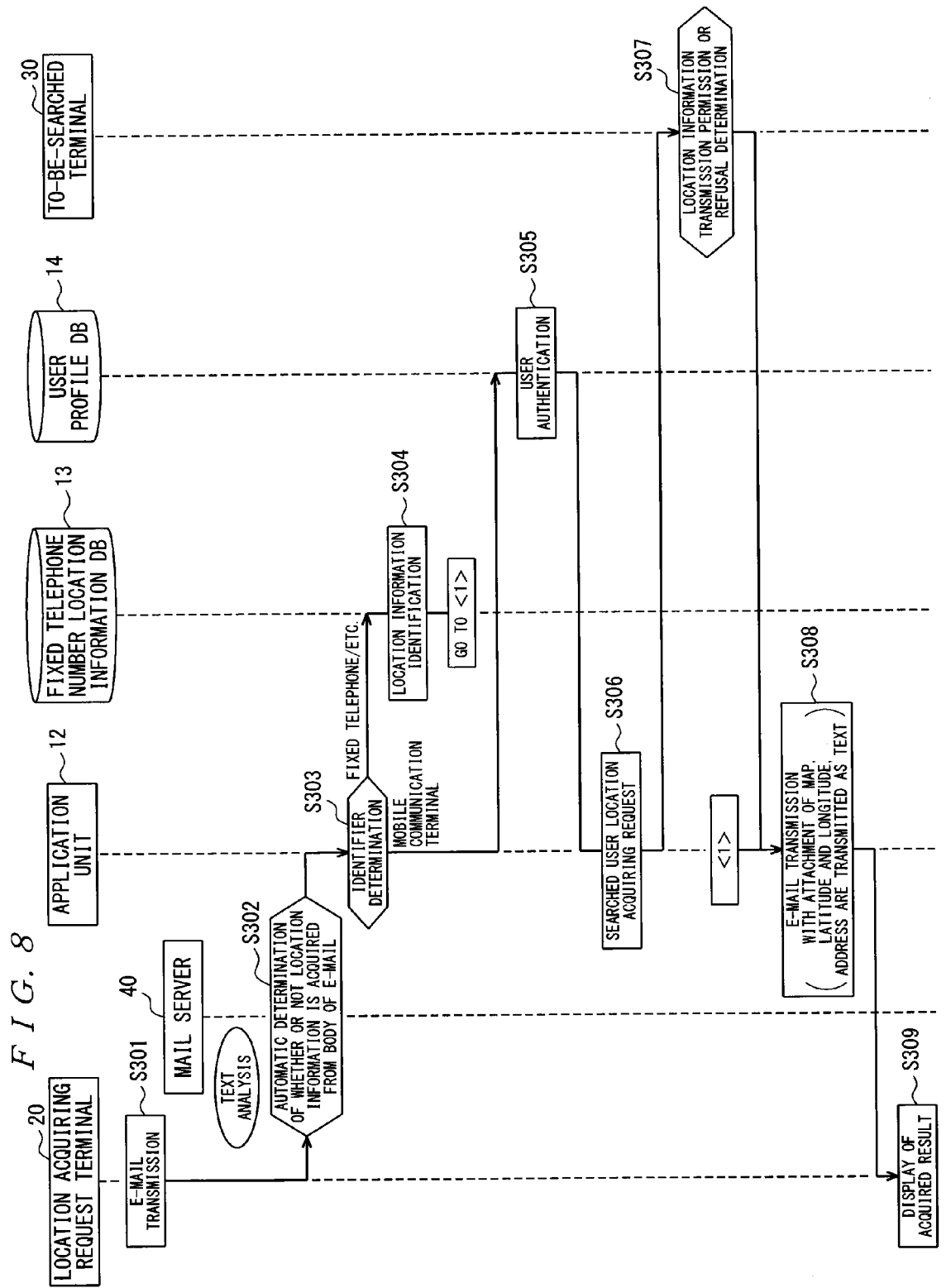

LOCATION ACQUIRING SYSTEM AND LOCATION INFORMATION ACQUIRING METHOD

TECHNICAL FIELD

The present invention relates to a location acquiring system for performing navigation with location information of a mobile communication terminal as a destination, and a location information acquiring method.

BACKGROUND ART

A navigation device having a map display function is provided with a path search function of searching for the shortest distance from a current location to a destination, or for the shortest time in consideration of dynamically changing traffic information. A method of setting a destination to be set for the path search at first includes a method of setting the destination directly with the use of a telephone number of a fixed telephone. An example is that the location of the destination is determined from the telephone number of the fixed telephone that has been installed at the destination (hereinafter, this method is referred to as "telephone number input method").

In such a telephone number input method, a user inputs a telephone number via input means such as a touch panel or the like equipped in a navigation device. A memory device such as a CD-ROM, DVD-ROM, or the like equipped in the navigation device stores the telephone number of the fixed telephone and location information of where the fixed telephone is located, and name information, facility information, address information, messages, images as attribute information of the telephone number (hereinafter, those pieces of information will be referred to as "guide information"), and area code and local number and the relationship of representative location information of the area that the number.

Then, the guide information is searched for from the telephone number input by the user. In this situation, if there is a telephone number, stored in the guide information, that matches the telephone number input by the user, the location information will be read out from the guide information to determine the location of the destination (for example, see Patent Document 1).

Conversely, if there is no telephone number, stored in the guide information, that matches the telephone number input by the user, the representative location information of the area that the area code and local number included in the telephone number cover will be searched for. In addition, a map with the representative location being centered is displayed, so that the user scrolls the map to determine the location of the destination.

Alternatively, if there is no telephone number, stored in a user portable navigation device, that matches the telephone number input by the user, there is a method of inquiring at a database server residing on a communication network to acquire the location information (for example, see Patent Document 2).

By use of such a telephone number input method, it will be made possible to set a destination, only if the telephone number of the fixed telephone installed at the destination is known.

Meanwhile, in addition to the fixed telephone, there is a navigation device that enables a path search for a destination by acquiring location information of a mobile communication terminal and setting it as the destination (for example, see Patent Document 3).

PRIOR ART DOCUMENTS

Patent Documents

Patent Document 1: JP 2000-298033 A
Patent Document 2: JP 2000-009486 A
Patent Document 3: JP 2006-105731 A

SUMMARY OF THE INVENTION

Problem to be Solved

It should be noted that, however, the navigation device described in Patent Document 3 establishes a session with the mobile communication terminal by periodically retransmitting signals, transmits a request signal of acquiring the location information of the mobile communication terminal via the established session, and acquires the location information thereof in order to track the movement of the mobile communication terminal. Hence, even while the mobile communication terminal is not moving, the signals are transmitted and received over the communication networks, leading to waste of network resources.

As another drawback, the information available at the time of transmitting the request signal of acquiring the location information of the mobile communication terminal is limited to the location information. It is impossible to confirm the situation of the user who is using the mobile communication terminal. Besides, in a case where the function of the navigation device is tried to be achieved on an existing mobile communication terminal, the existing mobile communication device does not have the function of transmitting the request signal of acquiring the location information. Accordingly, desirable is the method of acquiring the location information with ease, even if there is difficulty in transmitting the request signal of acquiring the location information.

The present invention has been made in view of the above drawbacks, and has an object of providing a location acquiring system that enables acquisition of location information that keeps track of the movement of a mobile communication terminal to be searched for, while suppressing the transmission and reception of signals for acquiring the location information, and a location information acquiring method.

Solution to the Problem

In order to address the above drawbacks, the present invention proposes a system and a method to be described below.

According to an aspect of the present invention, there is provided a location acquiring system for controlling acquiring of location information, of a mobile communication terminal to be searched for, to be provided for a location acquiring request terminal, an information transmission and reception unit for controlling transmission and reception of information via a communication network; and a session establishment unit for establishing a session between the location acquiring request terminal and the mobile communication terminal for continuously transmitting the location information of the mobile communication terminal to the location acquiring request terminal, in an event when the information transmission and reception unit receives the location information acquiring request information for making a request of acquiring the location information of the mobile communication terminal from the location acquiring request terminal.

According to the present invention, when the location acquiring system receives the location information acquiring request information from the location acquiring request terminal, a session is established between the location acquiring request terminal and the mobile communication terminal for continuously transmitting the location information of the mobile communication terminal to the location acquiring request terminal. Thereby, the location information of the mobile communication terminal can be transmitted continuously via the established session, without transmitting or receiving the signals for establishing a session whenever the location information is acquired. It is therefore possible to acquire the location information that keeps track of the movement of the mobile communication terminal with the signals transmitted and received for acquiring the location information being suppressed.

In the above location acquiring system, the mobile communication terminal may transmit the location information of the mobile communication terminal to the location acquiring request terminal via the session established by the session establishment unit, whenever an amount of change in the location information exceeds a threshold value.

According to the present invention, the mobile communication terminal transmits the location information via the established session, whenever the amount of change in the location information of the mobile communication terminal. Therefore, this prevents useless transmission of the location information when the mobile communication terminal does not move, thereby reducing the signals transmitted and received.

The above location acquiring system may further comprise at least one of: a session switch unit for switching the session established by the session establishment unit for transmitting the location information of the mobile communication terminal to a session for transmitting and receiving U-PLANE data; and an application addition switch unit for allowing the U-PLANE data to be transmitted and received by switching to or adding an application on the session established by the session establishment unit.

According to the present invention, the user who uses the location acquiring request terminal switches the session for transmitting the location information to the session for a voice communication or a TV communication, without newly inputting a telephone number of the mobile communication terminal for a signal transmission operation. Alternatively, the voice communication, the TV communication or exchanging of a text message via the session for transmitting the location information allows the user who uses the location acquiring request terminal to communicate with the user who uses the mobile communication terminal, thereby improving the convenience in use.

According to another aspect of the present invention, there is provided a location acquiring system for controlling acquiring of location information, of a mobile communication terminal to be searched for, to be provided for a location acquiring request terminal, an information transmission and reception unit for receiving an e-mail from the location acquiring request terminal to the mobile communication terminal; and a location information notification determination unit for analyzing a content of the e-mail received by the information transmission and reception unit, and for determining whether or not the location information of the mobile communication terminal needs to be notified to the location acquiring request terminal.

According to the present invention, even in a case where the location acquiring request terminal does not have a function of transmitting a location information acquiring request signal, an e-mail having a prescribed content to a mobile communication terminal relating to navigation. This allows the location acquiring request terminal to acquire the location information of the mobile communication terminal.

The above location acquiring system may further comprise a location information notification unit transmits the e-mail attached with map data for displaying a map of an area indicated by the location information of the mobile communication terminal to the location acquiring request terminal, when the location information notification determination unit determines that the location information of the mobile communication terminal needs to be notified to the location acquiring request terminal.

According to the present invention, the location acquiring system transmits to the location acquiring request terminal an e-mail with an attached file of a map including the place indicated by the location information of the mobile communication terminal. Therefore, the user who uses the location acquiring request terminal is able to confirm the place with ease where the mobile communication terminal is located by opening the e-mail.

According to yet another aspect of the present invention, there is provided a location acquiring method performed by a location acquiring system for controlling acquiring of location information, of a mobile communication terminal to be searched for, to be provided for a location acquiring request terminal, the location acquiring method comprising: receiving location information acquiring request information for making a request of acquiring the location information of the mobile communication terminal, from the location acquiring request terminal; and establishing a session between the location acquiring request terminal and the mobile communication terminal for continuously transmitting the location information of the mobile communication terminal to the location acquiring request terminal, in an event of receiving the location information acquiring request information in the receiving.

According to the present invention, when the location acquiring system receives the location information acquiring request information from the location acquiring request terminal, the session is established between the location acquiring request terminal and the mobile communication terminal for continuously transmitting the location information of the mobile communication terminal from the mobile communication terminal to the location acquiring request terminal. This makes it possible to continuously transmit the location information of the mobile communication terminal via the established session without transmitting or receiving the signals for establishing the session whenever the location information is acquired. Therefore, it is made possible to acquire the location information that keeps track of the movement of the mobile communication terminal, while suppressing the transmission and reception of the signals for acquiring the location information.

In the above location acquiring system, the session establishment unit is capable of establishing a session for transmitting and receiving U-PLANE data from the mobile communication terminal and the location acquiring request terminal. The location acquiring system may further comprise at least one of: a session switch unit for switching the session established by the session establishment unit for transmitting the U-PLANE data to a session for transmitting the location information from the mobile communication terminal; and an application addition switch unit for allowing the location information to be transmitted by switching to or adding an application on the session established by the session establishment unit.

According to the present invention, when a user of, for example, a location acquiring request terminal (or a mobile communication terminal inputs a telephone number of the mobile communication terminal (or the location acquiring request terminal) for a signal transmission operation, the session for transmitting the U-PLANE data for a voice communication, TV telephone, or the like is established. After that, the session for transmitting the U-PLANE data can be switched to the session for transmitting the location information, and in addition, the location information can be transmitted via the session for transmitting the U-PLANE data. It is therefore possible to perform a navigation of the mobile communication terminal after communicating with the user who uses the mobile communication terminal. This improves the convenience in use. As a specific example, the present invention is effective in a case where a user transmits a signal to an emergency agency, the emergency agency continuously acquires the user's location.

Advantageous Effects of the Invention

According to the present invention, when the location acquiring system acquires location information acquiring request information from a location acquiring request terminal, a session is established between the location acquiring request terminal and the mobile communication terminal for continuously transmitting the location information of the mobile communication terminal from the mobile communication terminal to the location acquiring request terminal. Thereby, the location information of the mobile communication terminal can be continuously transmitted via the established session, without transmitting or receiving the signals for establishing a session whenever the location information is acquired. It is therefore made possible to acquire the location information that keeps track of the movement of the mobile communication terminal with the signals transmitted and received for acquiring the location information being suppressed.

BRIEF DESCRIPTION OF THE DRAWINGS

FIG. 8 is a sequence chart illustrative of a flow of a location information acquiring determination process performed by the location acquiring system according to the embodiment.

DESCRIPTION OF EMBODIMENTS

Figure 1:
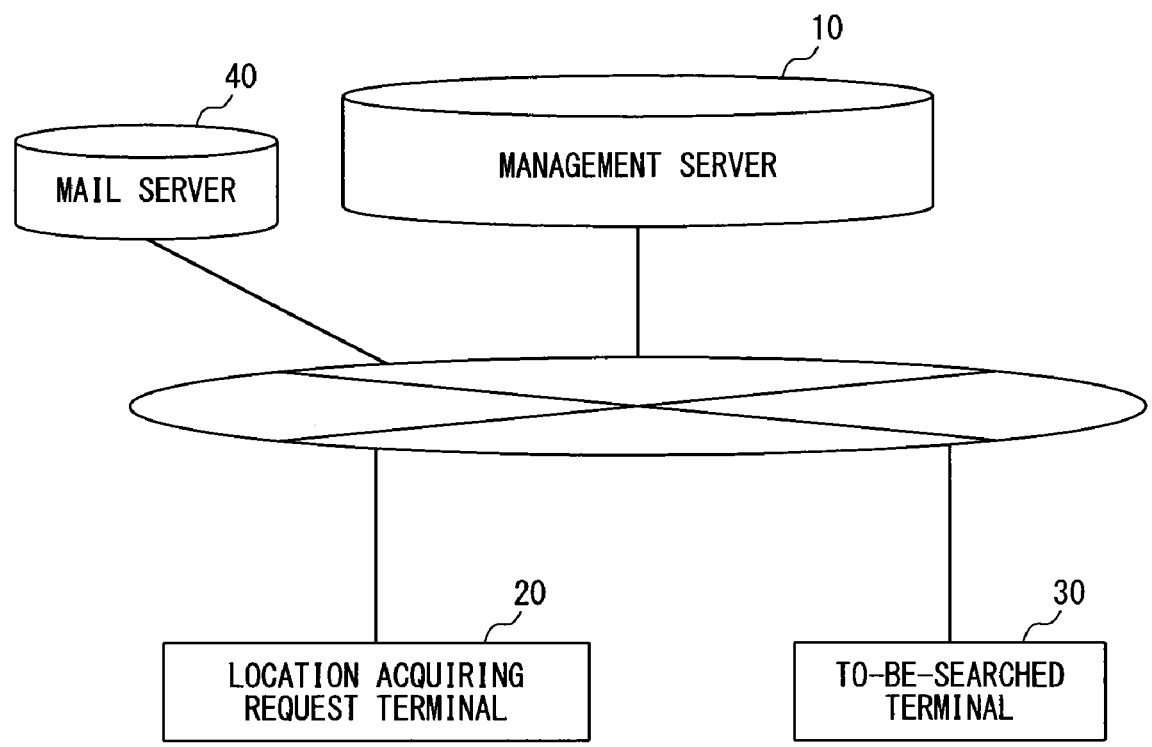
FIG. 1 is a block diagram illustrative of the overall configuration of a location acquiring system according to an embodiment of the present invention.

Hereinafter, embodiments of the present invention will be described with reference to drawings.

Additionally, the same components have the same reference numerals and an overlapping description will be omitted.

(Overall Configuration)

FIG. 1 is a block diagram illustrative of the overall configuration of a location acquiring system according to an embodiment of the present invention. The location acquiring system according to the present embodiment is a communication system on a basis of an IP Multimedia Subsystem (IMS), for example. Referring to FIG. 1, the location acquiring system includes a management server 10, a location acquiring request terminal 20, a to-be-searched terminal 30, and a mail server 40.

The location acquiring request terminal 20 is provided with a radio communication function installed in a mobile communication terminal and a navigation function to a destination. The location acquiring request terminal 20 navigates a path to the to-be-searched terminal 30 by setting location information of the to-be-searched terminal 30 as a destination, or by merely displaying the location information of the to-be-searched terminal 30.

The to-be-searched terminal 30 is a mobile communication terminal or a fixed telephone, and is a terminal to be a target of the path search by the location acquiring request terminal 20.

The management server 10 controls reception of signals from mobile communication terminals, authentication of signal-transmitting and signal-receiving terminals, notification of the location information of the to-be-searched terminal 30, session establishments, and the like.

(Configuration of Management Server)

Figure 2:
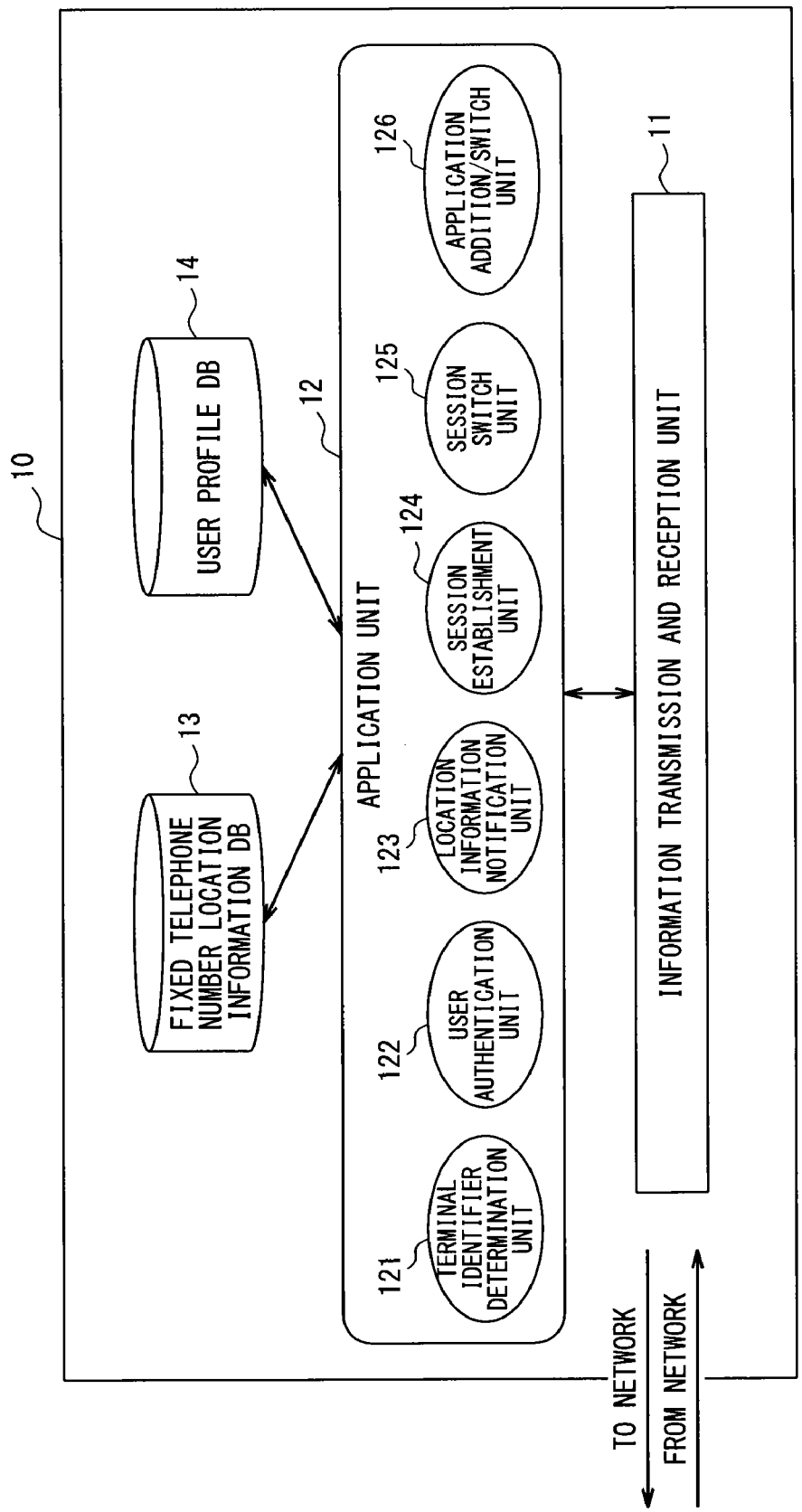
FIG. 2 is a block diagram illustrative of a management server according to the embodiment.

Next, the configuration of the management server 10 will be described. FIG. 2 is a block diagram illustrative of the management server 10. Referring to FIG. 2, the management server 10 includes an information transmission and reception unit 11, an application unit 12, a fixed telephone number location information database (DB) 13, and a user profile DB 14.

The fixed telephone number location information DB 13 stores a user identifier (telephone number or e-mail address) of a fixed terminal such as a fixed telephone, a personal computer, or the like, and location information of a place where the fixed telephone or the fixed terminal is installed, in association with each other.

The user profile DB 14 stores profiles of users who are subscribed in mobile communication services.

The profiles of the users include terminal identification numbers of the mobile communication terminals used by the users, telephone numbers, subscribed service types, in-area information, and the like.

The information transmission and reception unit 11 includes a communication interface, not illustrated, and controls transmission and reception of information via the communication networks with external communication devices.

The application unit 12 is a function achieved by the Central Processing Unit (CPU), not illustrated, reading and executing various application programs stored in a memory device such as a hard disk.

The application unit 12 includes a terminal identifier determination unit 121, a user authentication unit 122, a location information notification unit 123, a session establishment unit 124, a session switch unit 125, and an application addition switch unit 126.

When the information transmission and reception unit 11 receives location information acquiring request information to request for acquiring location information of the to-be-searched terminal 30, the terminal identifier determination unit 121 determines whether or not the to-be-searched terminal 30 is a mobile communication terminal based upon the identifier of the to-be-searched terminal 30 included in the location information acquiring request information.

When the terminal identifier determination unit 121 determines that the to-be-searched terminal 30 is a mobile communication terminal, the user authentication unit 122 authenticates the location acquiring request terminal 20 and the to-be-searched terminal 30 by referring to the user profile DB 14 to confirm the subscribed services, in-area information, and the like.

The location information notification unit 123 transmits searched user location acquiring request information (which corresponds to SIP INVITE command, for example) to the to-be-searched terminal 30 so as to acquire from the to-be-searched terminal 30 the location information of the to-be-searched terminal 30, in a case where the location information acquiring request information is received from the location acquiring request terminal 20 or in a case where a notification that the location information of the to-be-searched terminal 30 needs to be notified is received from the mail server 40, and in a case where the terminal identifier determination unit 121 determines that the to-be-searched terminal 30 is a mobile communication terminal.

On the other hand, the location information notification unit 123 acquires location information corresponding to the telephone number or e-mail address of the to-be-searched terminal 30 received from the fixed telephone number location information DB 13, in a case where the location information acquiring request information is received from the location acquiring request terminal 20 or in a case where a notification that the location information of the to-be-searched terminal 30 needs to be notified is received from the mail server 40, and in a case where the terminal identifier determination unit 121 determines that the to-be-searched terminal 30 is a fixed telephone or a fixed terminal.

Then, the location information notification unit 123 makes a form of the location information of the to-be-searched terminal 30 that has been acquired as described above in a format transmittable to the location acquiring request terminal 20, and then transmits it to the location acquiring request terminal 20. Specifically, in the transmission of the location information, the accuracy of the location information can also be transmitted. An e-mail may be transmitted with the body of a massage including the location information of the to-be-searched terminal 30 and with an attachment file of map data for displaying the map including the place to be displayed by the location information. Moreover, if the location information notification unit 123 is not capable of acquiring the location information of the to-be-searched terminal 30, information of the fact may be transmitted to the location acquiring request terminal 20.

The session establishment unit 124 establishes a session between the location acquiring request terminal 20 and the to-be-searched terminal 30 for continuously transmitting the location information of the to-be-searched terminal 30 to the location acquiring request terminal 20 by use of the existing IMS technology, in a case where the location information acquiring request information is received from the location acquiring request terminal 20 or in a case where a notification that the location information of the to-be-searched terminal 30 needs to be notified is received from the mail server 40, and in a case where the terminal identifier determination unit 121 determines that the to-be-searched terminal 30 is a mobile communication terminal.

The session establishment unit 124 is capable of establishing a session for transmitting U-PLANE data so that the location acquiring request terminal 20 and the to-be-searched terminal 30 make a voice call, a television telephone communication, an e-mail transmission, an Instant Message (IM) transmission, and the like.

The session switch unit 125 switches the session established by the session establishment unit 124 to another session for another use. For instance, the session switch unit 125 switches the session for transmitting the location information of the to-be-searched terminal 30 to the session for transmitting and receiving the U-PLANE data, or switches the session for transmitting the U-PLANE data to the session for transmitting the location information.

The application addition/switch unit 126 adds or switches an application on an upper layer to switch or add the use of the session, with the session established by the session establishment unit 124 on a lower layer being maintained.

Specifically, the application described herein denotes software such as programs and data for accomplishing various applications.

In more detail, upon receipt of an application switch signal from the location acquiring request terminal 20, while the navigation is being conducted on the location acquiring request terminal 20 after the location information of the to-be-searched terminal 30 is transmitted to the location acquiring request terminal 20 via the session established by the session establishment unit 124, the application addition/switch unit 126 switches the session established for transmitting the location information to the session for an application requested by the application switch signal. For instance, when the application switch signal is a television (TV) telephone switch signal, the application addition switch unit 126 switches the session established for transmitting the location information to the session for making a TV telephone for transmitting and receiving image data and voice data.

In addition, the session may be switched to not only the session for the TV telephone but also to the session for making a voice communication. The session may be switched to the session for IM transmission. Furthermore, in the event of receiving an application addition signal, the application addition switch unit 126 adds an application on an upper layer so that a TV telephone communication or IM transmission is made possible simultaneously, while transmitting the location information via the session established.

Likewise, the application addition/switch unit 126 is also capable of switching the session established by the session establishment unit 124 for transmitting the U-PLANE data to the session for transmitting the location information from the to-be-searched terminal 30, or is capable of transmitting the location information via the session for transmitting the U-PLANE data established by the session establishment unit 124, while transmitting the U-PLANE data.

Specifically, the IMS technology is herein described as a precondition. However, the similar technology is achievable in such a manner that the session information is held by an upper layer even in an application in which a one-time session is terminated on a lower layer.

(Configuration of Location Acquiring Request Terminal)

Figure 3:
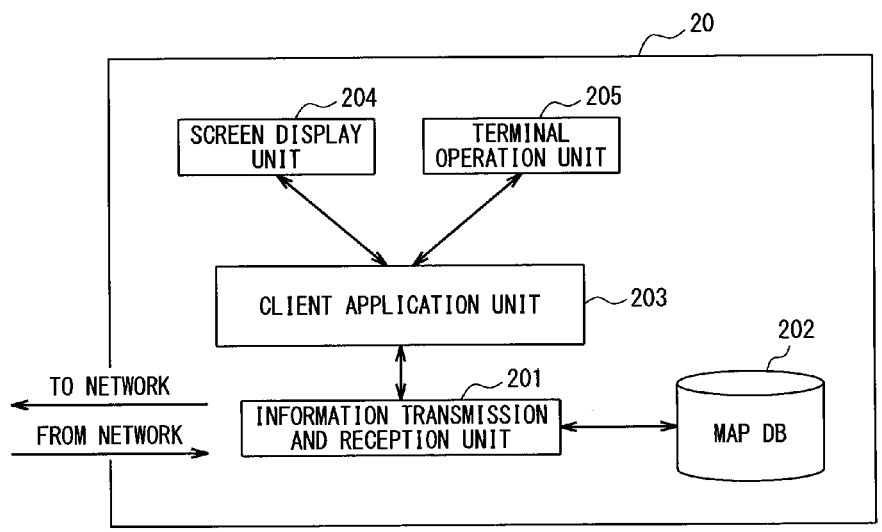
FIG. 3 is a block diagram illustrative of a configuration of a location acquiring request terminal according to the embodiment.

Subsequently, the configuration of the location acquiring request terminal 20 will be described. FIG. 3 is a block diagram illustrative of the configuration of the location acquiring request terminal 20. Referring to FIG. 3, the location acquiring request terminal 20 includes: an information transmission and reception unit 201 composed of a communication interface; a map DB 202 in which map data for displaying maps is stored; a client application unit 203 implemented by the CPU executing various application programs; a screen display unit 204 composed of a liquid crystal display; and a terminal operation unit 205 composed of keys and buttons.

The client application unit 203 has a navigation function, a TV telephone connection function, an e-mail function, an application switch signal transmission function, and the like. For instance, when the information transmission and reception unit 201 receives the location information of the to-be-searched terminal 30, the client application unit 203 activates the navigation function for performing navigation. To be more specific, the received location information is displayed on the screen display unit 204, or the map data for displaying the map including a destination indicated by the location information is acquired from the map DB 202, and then the map of the area of the destination and a path from the location acquiring request terminal 20 to the destination are displayed on the screen display unit 204.

Additionally, the map DB 202 may be stored in a server on a communication network, instead of being stored in the location acquiring request terminal 20.

(Configuration of to-be-Searched Terminal)

Figure 4:
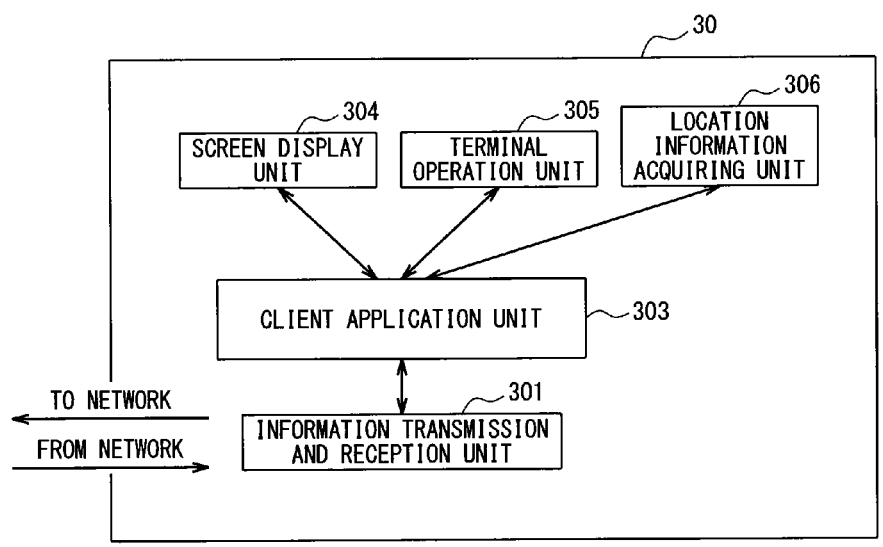
FIG. 4 is a block diagram illustrative of a configuration of a to-be-searched terminal according to the embodiment.

Next, a configuration of the to-be-searched terminal 30 will be described. FIG. 4 is a block diagram illustrative of the to-be-searched terminal 30. Referring to FIG. 4, the to-be-searched terminal 30 includes: an information transmission and reception unit 301 composed of a communication interface; a location information acquiring unit 302 including a Global Positioning System (GPS) receiver; a client application unit 303 implemented by the CPU executing various application programs; a screen display unit 304 composed of a liquid crystal display; and a terminal operation unit 305 composed of keys and buttons.

The client application unit 303 has a location information transmission permission or refusal determination function, a location information transmission function, a TV telephone connection function, an application switch response transmission function, an e-mail function, and the like.

For instance, on receipt of the location information acquiring request information of the to-be-searched terminal 30 from the management server 10, the client application unit 303 determines whether or not the location information of the to-be-searched terminal 30 is permitted to be transmitted based upon the input by the user on the terminal operation unit 305, in consideration of privacy protection of the user who uses the to-be-searched terminal 30. When determining that the location information of the to-be-searched terminal 30 is permitted to be transmitted, the client application unit 303 transmits the location information acquired by the location information acquiring unit 302 via the information transmission and reception unit 301. In addition, an amount of change in the location information acquired by the location information acquiring unit 302 is measured. Whenever the amount of change in the location information exceeds a prescribed threshold, the latest location information is transmitted to the navigation terminal location acquiring request terminal 20 via the session that has been established with the location acquiring request terminal 20. Furthermore, the transmission timing of the location information is not limited to this. Another example is that the location information may be transmitted in every certain period.

Conversely, when determining that the location information of the to-be-searched terminal 30 is not permitted to be transmitted, the client application unit 303 notifies the management server 10 of the fact via the information transmission and reception unit 301.

(Configuration of Mail Server)

Figure 5:
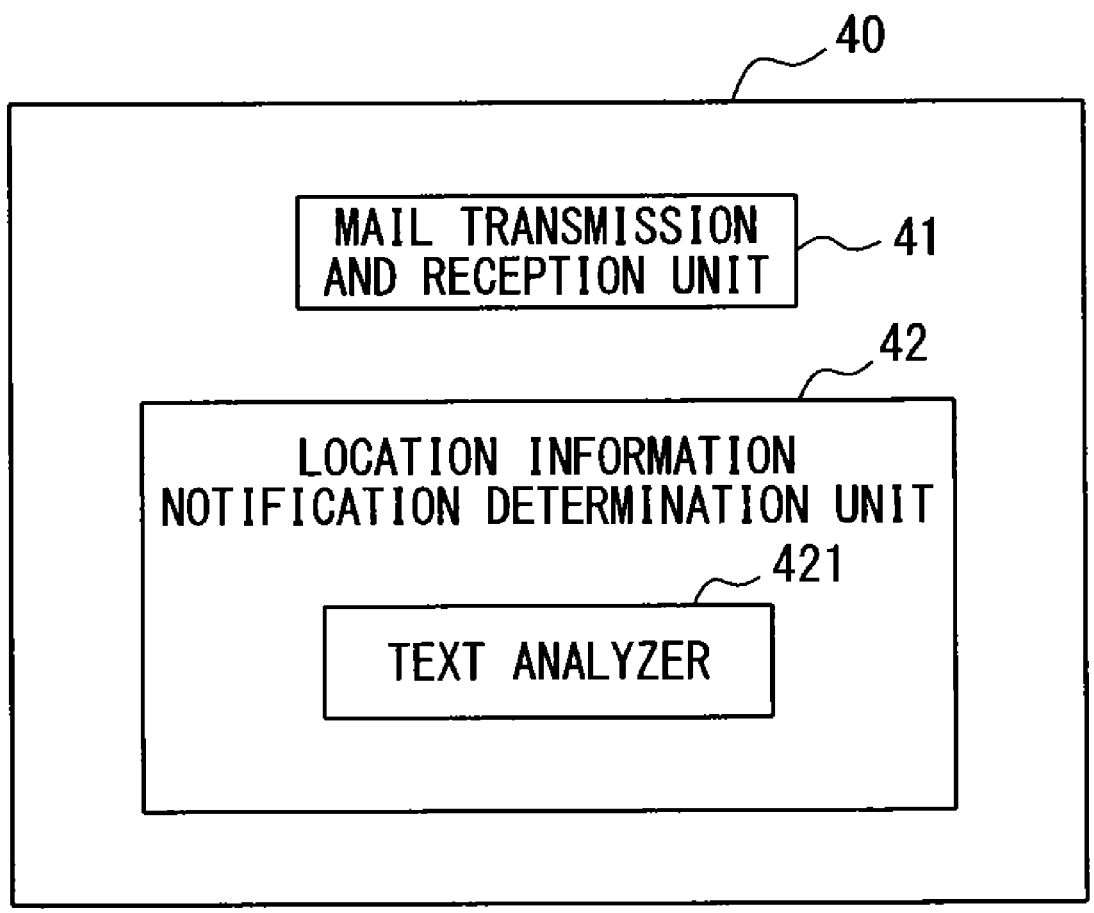
FIG. 5 is a block diagram illustrative of a configuration of a mail server according to the embodiment.

Now, a configuration of the mail server 40 will be described. FIG. 5 is a block diagram illustrative of a configuration of the mail server 40. Referring to FIG. 5, the mail server 40 includes: a mail transmission and reception unit 41; and a location information notification determination unit 42.

The mail transmission and reception unit 41 relays transmission and reception of e-mail.

The location information notification determination unit 42 analyzes the content of an e-mail received by the mail transmission and reception unit 41, and determines whether or not the location information of the to-be-searched terminal 30 needs to be notified to the location acquiring request terminal 20.

In more detail, the location information notification determination unit 42 is provided with a text analyzer 421. The text data of an e-mail body is analyzed by the text analyzer 421, so the location information notification determination unit 42 determines whether or not the location information of the to-be-searched terminal 30 needs to be notified to the location acquiring request terminal 20 based upon the analysis result. For example, where there is a keyword such as "getting together", "where are you?", "moving to", "I am now in . . .", "Let' s meet at . . . ", or the like is included in the text data of the e-mail body, it is determined that the location information of the to-be-searched terminal 30 needs to be notified to the location acquiring request terminal 20. Alternatively, the location information notification determination unit 42 speculates the feelings of the user who uses the location acquiring request terminal 20 from the content of the e-mail body. For instance, when speculating that the user who uses the location acquiring request terminal 20 desires to meet the user who uses the to-be-searched terminal 30, the location information notification determination unit 42 determines that the location information of the to-be-searched terminal 30 needs to be notified to the location acquiring request terminal 20. Then, when determining that the location information needs to be notified, the location information notification determination unit 42 notifies this fact to the management server 10.

(Session Establishment Process)

Figure 6:
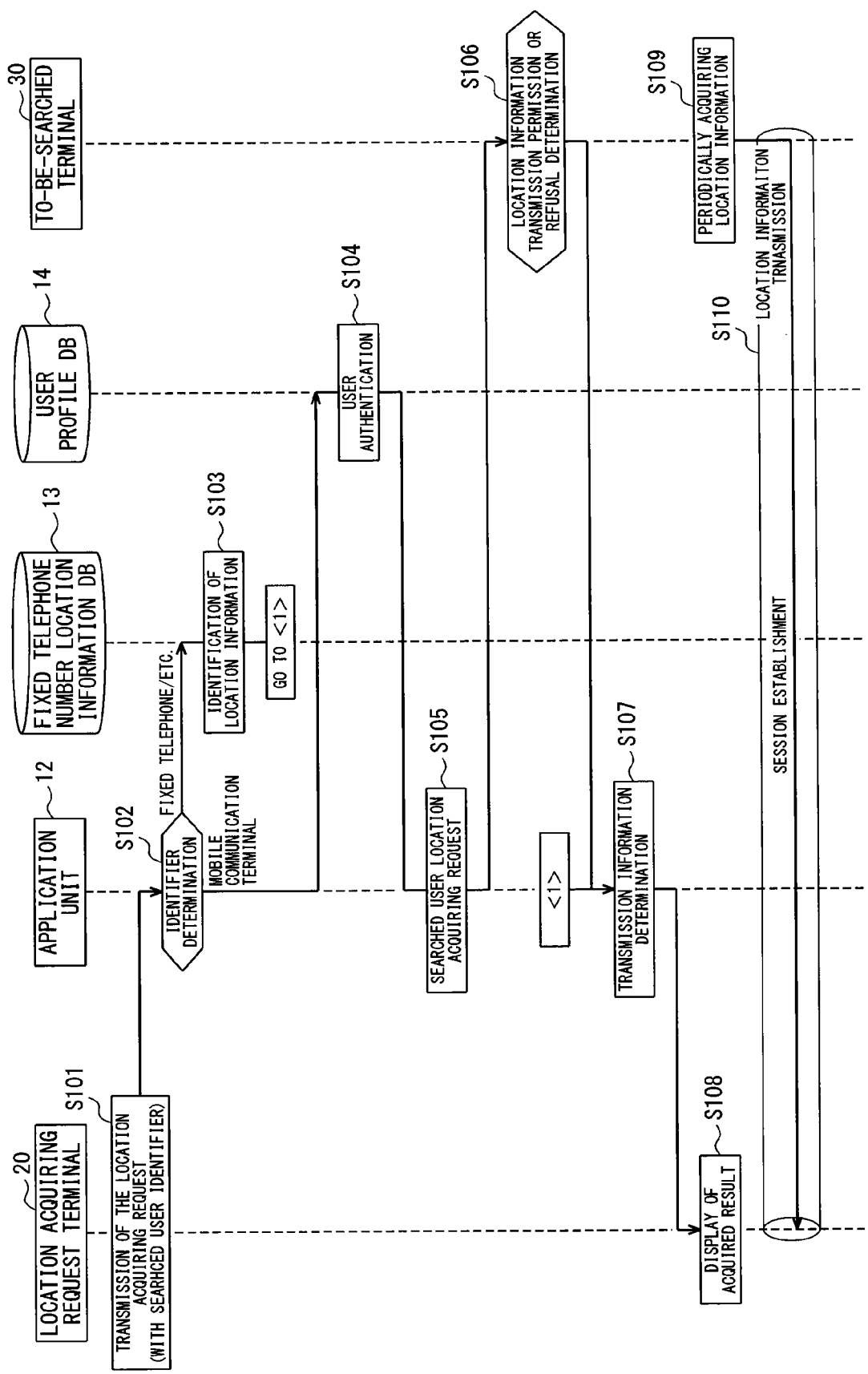
FIG. 6 is a sequence chart illustrative of a flow of a session establishment process for transmitting location information performed by the location acquiring system according to the embodiment.

Next, with reference to the sequence chart illustrated in FIG. 6, a description will be given of a session establishment process for transmitting the location information, which is implemented by the location acquiring system.

Firstly, the user who uses the location acquiring request terminal 20 operates the terminal operation unit 205 to input a user identifier such as a telephone number or the like of the to-be-searched terminal 30, and makes a location information acquiring request. This causes the information transmission and reception unit 201 of the location acquiring request terminal 20 to transmit the location acquiring request information including the user identifier of the to-be-searched terminal 30 (step S101).

The terminal identifier determination unit 121 of the management server 10 determines whether or not the user identifier included in the location acquiring request information is that of a mobile communication terminal (step S102). When the user identifier is determined to be that of a fixed telephone other than a mobile communication terminal, the location information notification unit 123 refers to the fixed telephone number location information DB 13 and identifies the location information corresponding to the user identifier of the to-be-searched terminal 30 (step S103). Processing goes on to step S107.

On the other hand, when the user identifier is determined to be that of a mobile communication terminal, the user authentication unit 122 performs a user authentication of the location acquiring request terminal 20 and the to-be-searched terminal 30, and confirms the place where the to-be-searched terminal 30 is located (step S104). The location information notification unit 123 transmits searched user location acquiring request information to the to-be-searched terminal 30 via the information transmission and reception unit 11 (step S105).

When the information transmission and reception unit 301 of the to-be-searched terminal 30 receives the searched user location acquiring request information from the management server 10, the client application unit 303 performs the location information transmission permission or refusal determination (step S106). When the user who uses the to-be-searched terminal 30 operates the terminal operation unit 305 and inputs a transmission permission, the client application unit 303 determines that the transmission is permitted and then transmits to the management server 10 the location information acquired by the location information acquiring unit 302 via the information transmission and reception unit 301.

At step S107, the location information notification unit 123 of the management server 10 generates and determines the information to be transmitted based upon the acquired location information, and then transmits to the location acquiring request terminal 20 via the information transmission and reception unit 11.

When the information transmission and reception unit 201 of the location acquiring request terminal 20 receives the location information of the to-be-searched terminal 30 from the management server 10, the client application unit 203 activates the navigation function, acquires from the map DB 202 map data for displaying a map including the place indicated by the location information, and displays the map on the screen display unit 204 (step S108).

After that, the location information acquiring unit 302 periodically acquires the location information (step S109).

The session establishment unit 124 of the management server 10 establishes a session for continuously transmitting to the location acquiring request terminal 20 the location information of the to-be-searched terminal 30 periodically acquired (step S110).

The session for transmitting the location information continuously is established in this manner, thereby making it possible to receive the location information periodically from the to-be-searched terminal 30 via the established session, even if the location acquiring request terminal 20 does not retransmit the signals for transmission and reception for session establishment whenever the location information is acquired. This brings an effect of reducing the number of the signals, accordingly.

(TV Telephone Switch Process)

Figure 7:
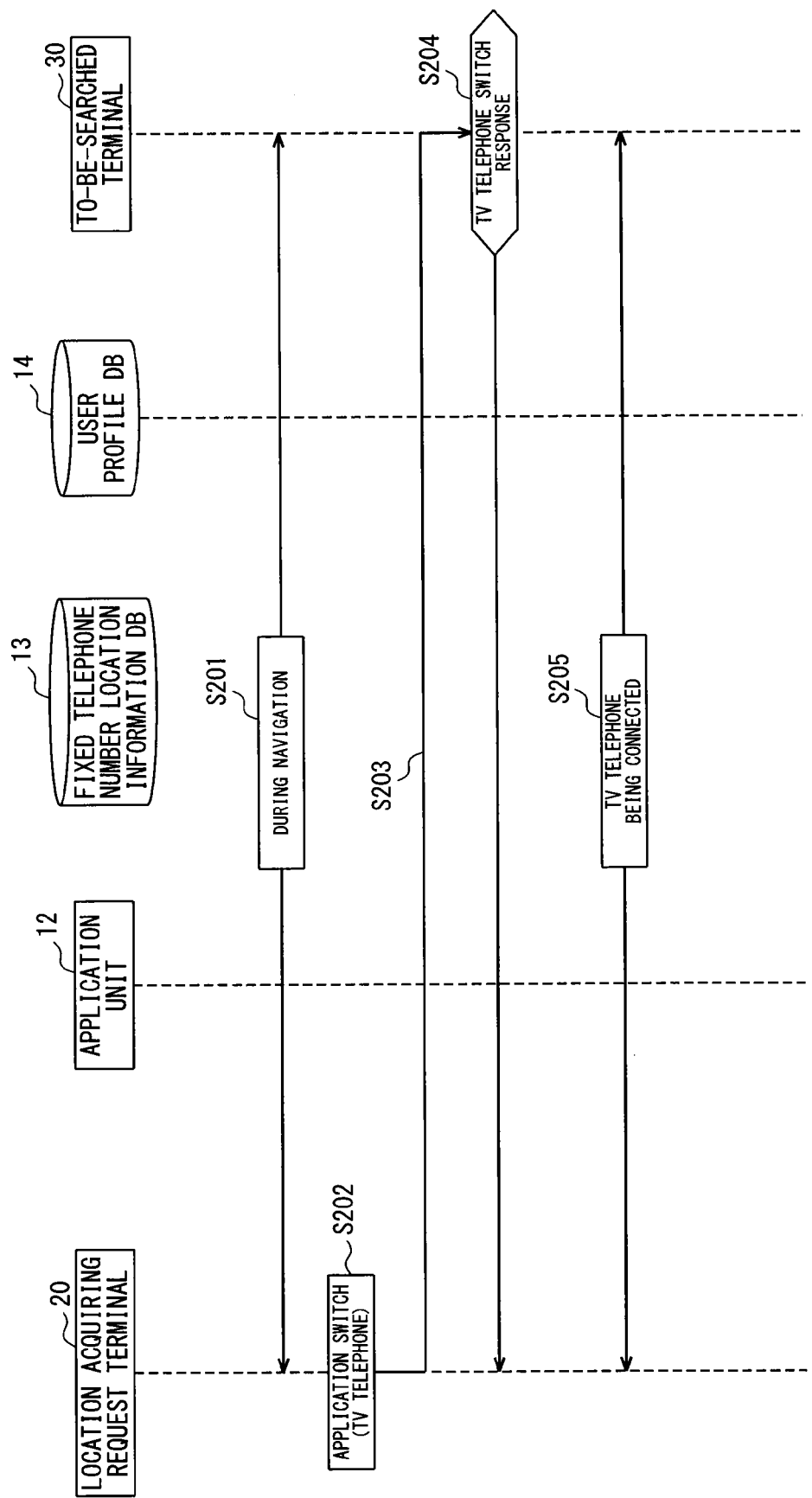
FIG. 7 is a sequence chart illustrative of a flow of a TV telephone switch process during navigation performed by the location acquiring system according to the embodiment.

Next, with reference to the sequence chart illustrated in FIG. 7, a description will be given of a TV telephone switch process during navigation.

In the middle of the navigation being performed on the location acquiring request terminal 20 after the location information of the to-be-searched terminal 30 is transmitted to the location acquiring request terminal 20 via the session established by the above-described session establishment process (step S201), the user operates for giving an instruction to switch to TV telephone by pushing a button for switching on the terminal operation unit 205 of the location acquiring request terminal 20 (step S202). This causes the client application unit 203 of the location acquiring request terminal 20 to transmit the TV telephone switch signal to the to-be-searched terminal 30 via the information transmission and reception unit 201 and the session switch unit 125 or the application addition switch unit 126 of the management server 10 (step S203).

Upon receipt of the TV telephone switch signal from the location acquiring request terminal 20 via the information transmission and reception unit 301, the client application unit 303 of the to-be-searched terminal 30 makes a TV telephone switch response (step S204).

Accordingly, the session for transmitting the location information being established between the location acquiring request terminal 20 and the to-be-searched terminal 30 is switched to a session for TV telephone for transmitting and receiving voice data and image data, so a TV telephone connection is performed (step S205).

Thus, the user who uses the location acquiring request terminal 20 is able to communicate with the user who uses the to-be-searched terminal 30 by switching to the TV telephone during the navigation, without inputting the telephone number again for signal transmission. This enables the improvement in the user convenience.

(Location Information Acquiring Presence or Absence Determination Process)

Next, with reference to FIG. 8, a location information acquiring presence or absence determination process with a mail analysis will be described.

Firstly, the user who uses the location acquiring request terminal 20 operates the terminal operation unit 205 of the location acquiring request terminal 20 to generate the text characters of an e-mail, and designates the e-mail address of the to-be-searched terminal 30 to give an instruction for transmission. This causes the client application unit 203 of the location acquiring request terminal 20 to transmit an e-mail to the to-be-searched terminal 30 via the information transmission and reception unit 201 (step S301).

When the mail transmission and reception unit 41 of the mail server 40 receives the e-mail from the location acquiring request terminal 20, the text analyzer 421 analyzes text data in the e-mail body. The location information notification determination unit 42 determines whether or not the location information of the to-be-searched terminal 30 needs to be acquired based upon the analysis result (step S302). When determining that the location information needs to be acquired, the location information notification determination unit 42 notifies the determination result to the management server 10.

When the information transmission and reception unit 11 receives the determination result from the mail server 40, the terminal identifier determination unit 121 determines whether or not the to-be-searched terminal 30 is a mobile communication terminal based upon the mail address of the to-be-searched terminal 30 (step S303). When the to-be-searched terminal 30 is determined to be a fixed terminal or the like other than a mobile communication terminal, the location information notification unit 123 identifies the location information corresponding to the mail address of the to-be-searched terminal 30, by referring to the fixed telephone number location information DB 13 (step S304). Processing goes on to step S308.

On the other hand, when the to-be-searched terminal 30 is determined to be a mobile communication terminal, the user authentication unit 122 performs a user authentication of the location acquiring request terminal 20 and the to-be-searched terminal 30 and confirms where the to-be-searched terminal 30 is located in the area (step S305). The location information notification unit 123 transmits the searched user location acquiring request information to the to-be-searched terminal 30 via the information transmission and reception unit 11 (step S306).

When the information transmission and reception unit 301 of the to-be-searched terminal 30 receives the searched user location acquiring request information from the management server 10, the client application unit 303 performs the location information transmission permission or refusal determination (step S307). When the user who uses the to-be-searched terminal 30 operates the terminal operation unit 305 to input a transmission permission, the client application unit 303 determines that the transmission is permitted and then transmits the location information acquired by the location information acquiring unit 302 to the management server 10 via the information transmission and reception unit 301.

At step S308, the location information notification unit 123 of the management server 10 includes latitude and longitude and an address indicated by the acquired location information in the body of the mail, and also generates an e-mail attached with map data for displaying the map of the area of the latitude and longitude as an attachment file, so that the information transmission and reception unit 11 transmits the generated e-mail to the location acquiring request terminal 20.

When the information transmission and reception unit 201 of the location acquiring request terminal 20 receives an e-mail from the management server 10, the client application unit 203 displays the e-mail on the screen display unit 204 (step S309).

In this manner, even if the location acquiring request terminal 20 does not have a function of transmitting a location information acquiring request signal, an e-mail is transmitted by use of the e-mail function. Then, the mail server 40 analyzes the content of the e-mail. When it is determined that the location information of the to-be-searched terminal 30 needs to be acquired based upon the analysis result, the location acquiring request terminal 20 is capable of acquiring the location information of the to-be-searched terminal 30. In addition, the management server 10 transmits the map data for displaying the map of the area of the place indicated by the location information of the to-be-searched terminal 30, as an attachment file, to the location acquiring request terminal 20. Therefore, the user who uses the location acquiring request terminal 20 is capable of confirming the place where the to-be-searched terminal 30 is located with ease by opening the e-mail.

As described heretofore, the management server 10 receives from the location acquiring request terminal 20 the location information acquiring request information for making a request of acquiring the location information of the to-be-searched terminal 30. When the to-be-searched terminal 30 is a mobile communication terminal, a session for continuously transmitting the location information of the to-be-searched terminal 30 from the to-be-searched terminal 30 to the location acquiring request terminal 20 is established between the location acquiring request terminal 20 and the to-be-searched terminal 30. Accordingly, even if the signals for session establishment are not transmitted and received whenever the location information is acquired, the location information of the to-be-searched terminal 30 can be transmitted continuously via the established session. It is therefore possible for the location acquiring request terminal 20 to set the to-be-searched terminal 30 as a destination of navigation, by acquiring the location information that keeps track of the movement of the to-be-searched terminal 30, with the signals transmitted and received for acquiring the location information being suppressed. Additionally, the to-be-searched terminal 30 transmits the location information whenever an amount of change in the location information of the to-be-searched terminal 30 exceeds a threshold value. This prevents the transmission of the location information, when the to-be-searched terminal 30 does not move, thereby alleviating the load applied onto the communication network or the location acquiring system.

By use of such a location acquiring system in getting together, for example, it is made possible to get together at an approximate time and place without deciding the meeting place definitely. The user is able to use the location acquiring request terminal 20 in the vicinity of the meeting place to confirm the location of the to-be-searched terminal 30.

In addition, the user who uses the location acquiring request terminal 20 uses the navigation function of the location acquiring request terminal 20 to get to the place with ease where the to-be-searched terminal 30 is located, even if the user who uses the to-be-searched terminal 30 is not able to make a response to a call on a train or the like. Furthermore, even while the navigation function is being used, the user who uses the location acquiring request terminal 20 is able to talk with the user who uses the to-be-searched terminal 30 on a voice communication, TV telephone, or the like. The user is able to arrive at the place with ease where the user who uses the to-be-searched terminal 30 is located, while looking at the map.

Moreover, the session for transmitting the U-PLANE data for performing the voice call or TV telephone can be switched to the session for transmitting the location information. Accordingly, in a case where the user of the to-be-searched terminal 30 makes a call to an emergency agency corresponding to the location acquiring request terminal 20, the user and the emergency agency communicate with each other. After that, the emergency agency is able to acquire the user's location continuously and confirm the location of the user.

In the above-described embodiments, the location information of the to-be-searched terminal 30 is acquired by a GPS receiver mounted on the to-be-searched terminal 30. However, the method of acquiring the location information of the to-be-searched terminal 30 is not limited to this. For example, the location information of a base transceiver station for covering the area where the to-be-searched terminal 30 is being located may be the location information of the to-be-searched terminal 30.

In addition, the function equipped in the management server 10 that have been described in the above-described embodiments may be distributed in plural servers. Furthermore, the functions equipped in the mail server 40 that have been described in the above-described embodiments may be equipped in the management server 10.

REFERENCE SIGNS LIST

10 management server
11 information transmission and reception unit
12 application unit
121 terminal identifier determination unit
122 user authentication unit
123 location information notification unit
124 session establishment unit
125 session switch unit
126 application addition/switch unit
13 fixed telephone number location information DB
14 user profile DB
20 location acquiring request terminal
201 information transmission and reception unit
202 map DB
203 client application unit
204 screen display unit
205 terminal operation unit
30 to-be-searched terminal
301 information transmission and reception unit
302 location information acquiring unit
303 client application unit 304 screen display unit
305 terminal operation unit
40 mail server
41 mail transmission and reception unit
42 location information notification determination unit
421 text analyzer

The invention claimed is:

1. A location acquiring system for controlling acquiring of location information of a searched mobile communication terminal to be searched for, comprising:
   a location acquiring request terminal,
   an information transmission and reception unit for controlling transmission and reception of information via a communication network; and
   a location information transmission session establishment unit for establishing a session between the location acquiring request terminal and the searched mobile communication terminal for continuously transmitting the location information of the searched mobile communication terminal to the location acquiring request terminal, when the information transmission and reception unit receives location information acquiring request information for making a request of acquiring the location information of the searched mobile communication terminal from the location acquiring request terminal,
   wherein the location acquiring request terminal regularly receives the location information of the searched mobile communication terminal via the session established by the location information transmission session establishment unit without transmitting the location information acquiring request information for making the request of acquiring the location information of the searched mobile communication terminal.

2. The location acquiring system according to claim 1, wherein the searched mobile communication terminal transmits the location information of the searched mobile communication terminal to the location acquiring request terminal via the session established by the location information transmission session establishment unit, whenever an amount of change in the location information exceeds a threshold value.

3. The location acquiring system according to claim 1 or claim 2, further comprising at least one of:
   a session switch unit for switching the session established by the location information transmission session establishment unit for transmitting the location information of the searched mobile communication terminal to a session for transmitting and receiving U-PLANE data; and
   an application addition/switch unit for allowing the U-PLANE data to be transmitted and received by switching to or adding an application on an upper layer, while maintaining the session on a lower layer established by the location information transmission session establishment unit.

4. A location acquiring system for controlling acquiring of location information, of a searched mobile communication terminal to be searched for, to be provided for a location acquiring request terminal, comprising:
   an information transmission and reception unit for receiving an e-mail from the location acquiring request terminal to the searched mobile communication terminal;
   a location information notification determination unit for analyzing a content of the e-mail received by the information transmission and reception unit, and for determining whether or not the location information of the searched mobile communication terminal needs to be notified to the location acquiring request terminal; and
   a location information transmission session establishment unit for establishing a session between the location acquiring request terminal and the searched mobile communication terminal for continuously transmitting the location information of the searched mobile communication terminal to the location acquiring request terminal, when the location information notification determination unit analyzes the content of the e-mail received by the information transmission and reception unit and determines that the location information of the searched mobile communication terminal needs to be notified to the location acquiring request terminal,
   wherein the location acquiring request terminal regularly receives the location information of the searched mobile communication terminal via the session established by the location information transmission session establishment unit without transmitting location information acquiring request information for making the request of acquiring the location information of the searched mobile communication terminal.

5. The location acquiring system according to claim 4, further comprising a location information notification unit for transmitting to the location acquiring request terminal the e-mail attached with map data for displaying a map of an area indicated by the location information of the searched mobile communication terminal when the location information notification determination unit determines that the location information of the searched mobile communication terminal needs to be notified to the location acquiring request terminal.

6. A location acquiring method performed by a location acquiring system for controlling acquiring of location information, of a searched mobile communication terminal to be searched for, to be provided for a location acquiring request terminal, the location acquiring method comprising:
   receiving location information acquiring request information for making a request of acquiring the location information of the searched mobile communication terminal, from the location acquiring request terminal; and
   establishing a location information transmission session between the location acquiring request terminal and the searched mobile communication terminal for continuously transmitting the location information of the searched mobile communication terminal to the location acquiring request terminal, in an event of receiving the location information acquiring request information in the receiving,
   wherein the location acquiring request terminal regularly receives the location information of the searched mobile communication terminal via the session established in the establishing without transmitting the location information acquiring request information for making the request of acquiring the location information of the searched mobile communication terminal.

7. The location acquiring system according to claim 1 or claim 2,
   wherein the location information transmission session establishment unit is capable of establishing a session for transmitting and receiving U-PLANE data from the searched mobile communication terminal and the location acquiring request terminal,
   the location acquiring system further comprising at least one of:
   a session switch unit for switching the session established by the location information transmission session establishment unit for transmitting the U-PLANE data to a session for transmitting the location information from the searched mobile communication terminal; and an application addition/switch unit for allowing the location information to be transmitted by switching to or adding an application on an upper layer while, maintaining the session on a lower layer established by the location information transmission session establishment unit.

8. The location acquiring system according to claim 1, further comprising:

a session switch unit for switching the session established by the location information transmission session establishment unit for transmitting the location information of the searched mobile communication terminal to a session for transmitting and receiving U-PLANE data; and an application addition/switch unit for allowing the U-PLANE data to be transmitted and received by switching to or adding an application on the session established by the session establishment unit, wherein when the application addition/switch unit receives an application switching signal for switching the application on the session established from the location acquiring request terminal to another application after the location information of the searched mobile communication terminal is transmitted to the location acquiring request terminal via the session established by the location information transmission session establishment unit, the application addition/switch unit switches the session established for transmitting the location information to another session to be used for the another session.

9. The location acquiring system according to claim 4, further comprising:

a session switch unit for switching the session established by the location information transmission session establishment unit for transmitting the location information of the searched mobile communication terminal to a session for transmitting and receiving U-PLANE data; and an application addition/switch unit for allowing the U-PLANE data to be transmitted and received by switching to or adding an application on the session established by the session establishment unit, wherein when the application addition/switch unit receives an application switching signal for switching the application on the session established from the location acquiring request terminal to another application after the location information of the searched mobile communication terminal is transmitted to the location acquiring request terminal via the session established by the location information transmission session establishment unit, the application addition/switch unit switches the session established for transmitting the location information to another session to be used for the another session.

10. The location acquiring system according to claim 4, further comprising a location information notification unit for transmitting to the location acquiring request terminal the e-mail attached with map data for displaying a map of an area indicated by the location information of the searched mobile communication terminal with a latitude, a longitude, and an address indicated by the location information being included in a body of the e-mail, when the location information notification determination unit determines that the location information of the searched mobile communication terminal needs to be notified to the location acquiring request terminal, wherein the location acquiring request terminal confirms the location information of the searched mobile terminal by opening the e-mail.

* * * * *